United States Patent
Zhu et al.

(10) Patent No.: US 7,169,348 B2
(45) Date of Patent: Jan. 30, 2007

(54) METHOD OF MAKING METAL OXIDE NANOPARTICLES IN AN EXFOLIATED SILICATE FRAMEWORK

(75) Inventors: Huai Yong Zhu, Ashfield (AU); Gao Qing Lu, Queensland (AU)

(73) Assignee: University of Queensland, Queensland (AU)

( * ) Notice: Subject to any disclaimer, the term of this patent is extended or adjusted under 35 U.S.C. 154(b) by 70 days.

(21) Appl. No.: 10/482,858

(22) PCT Filed: Jul. 6, 2001

(86) PCT No.: PCT/AU01/00821

§ 371 (c)(1),
(2), (4) Date: Jun. 15, 2004

(87) PCT Pub. No.: WO03/004412

PCT Pub. Date: Jan. 16, 2003

(65) Prior Publication Data
US 2004/0241427 A1  Dec. 2, 2004

(51) Int. Cl.
  *B32B 5/16* (2006.01)
  *C04B 35/64* (2006.01)
(52) U.S. Cl. .................... 264/673; 264/41; 264/42; 423/330.1; 428/404; 428/702
(58) Field of Classification Search ............ 264/41, 264/42, 673; 423/330.1; 428/702, 404
See application file for complete search history.

(56) References Cited

U.S. PATENT DOCUMENTS

| | | | | |
|---|---|---|---|---|
| 3,756,315 A | * | 9/1973 | Suman et al. ............... | 166/276 |
| 4,845,066 A | | 7/1989 | Fahey et al. | |
| 4,968,652 A | * | 11/1990 | Johnson et al. ............. | 502/63 |
| 5,340,657 A | * | 8/1994 | Kerby et al. ................ | 428/552 |
| 5,498,285 A | * | 3/1996 | Hooykaas ................... | 106/486 |
| 5,726,113 A | * | 3/1998 | Pinnavaia et al. ........... | 502/62 |
| 5,958,367 A | * | 9/1999 | Ying et al. .................. | 423/701 |
| 6,217,843 B1 | * | 4/2001 | Homyonfer et al. ...... | 423/593.1 |
| 6,492,298 B1 | * | 12/2002 | Sobukawa et al. ......... | 502/325 |
| 6,596,915 B1 | * | 7/2003 | Satyapal et al. ......... | 423/245.1 |
| 6,632,528 B1 | * | 10/2003 | Clough ...................... | 428/402 |

(Continued)

FOREIGN PATENT DOCUMENTS

EP  1 044 721 A1  10/2000

(Continued)

OTHER PUBLICATIONS

David M. Antonelli et al., *Synthesis and Characterization of Hexagonally Packed Mesoporous Tantalum Oxide Molecular Sieves*, Chem. Mater, vol. 8, No. 4, 1996, pp. 874-881.

(Continued)

*Primary Examiner*—H. Thi Le
(74) *Attorney, Agent, or Firm*—Workman Nydegger (57) ABSTRACT

A method of producing metal oxide nanoparticles in an exfoliated silicate framework by forming an aqueous exfoliated silicate suspension by mixing a layered clay into water until clear. To which is added an acidic hydrated metal species precursor solution, formed by dissolving one or more transitional metal salts, and a non-ionic surfactant. This solution is then aged to precipitate a product precursor before the product precursor is separated and washed. The product precursor is calcined to form metal oxide nanoparticles in an exfoliated silicate framework.

18 Claims, 6 Drawing Sheets

U.S. PATENT DOCUMENTS 6,703,501 B1* 3/2004 Kim et al. .................. 540/536
6,872,330 B2* 3/2005 Mack et al. ............ 252/378 R

FOREIGN PATENT DOCUMENTS

WO        WO 97/49488        12/1997

OTHER PUBLICATIONS

Peidong Yang et al., *Generalized Syntheses of Large-Pore Mesoporous Metal Oxides with Semicrystalline Frameworks*, Letters to Nature, vol. 396, Nov. 12, 1998, pp. 152-155.

C.T. Kresge et al., *Ordered Mesoporous Molecular Sieves Synthesized by a Liquid-crystal Template Mechanism*, Letters to Nature, vol. 359, Oct. 22, 1992, pp. 710-712.

S. Inagaki et al., *Synthesis of Highly Ordered Mesoporous Materials from a Layered Polysilicate*, J. Chem. Soc., Chem. Commun., 1993, pp. 680-682.

R. Burch, *Catalysis Today*, Pillared Clays, Chapter 1, vol. 2, No. 2-3, Feb. 1988.

I.V. Mitchell, *Pillared Layered Structures: Current Trends and Applications*, Elsevier Applied Science, London 1990, pp. xii-xxii.

Anne Galameau et al., *Porous Clay Heterostructures formed by Gallery-Templated Synthesis*, Letter to Nature, vol. 374, Apr. 6, 1995, pp. 529-531.

Kenzi Suzuki et al., *Thermal and Catalytic Properties of Alumina-pillared Montmorillonite Prepared in the Presence of Polyvinyl Alcohol*, Applied Catalysis, vol. 63, 1990, pp. 181-189.

Kenzi Suzuki et al., *Control of the Distance Between the Silicate Layers of Hectorite by Pillaring with Alumina in the Presence of Polyvinyl Alcohol*, J. Chem. Soc., Chem. Commun., 1991, pp. 873-874.

Laurent J. Michot et al., *Improved Synthesis of Alumina-Pillared Montmorillonite by Surfactant Modification*, Chem. Mater, vol. 4, No. 6, 1992, pp. 1433-1437.

G.W. Brindley et al., *Preparation and Properties of Some Hydroxy-Aluminium Beidellites*, Clay Minerals, vol. 12, 1977, pp. 229-237.

Derwent Abstract Accession No. 87-337800/48, Oct. 22, 1987.

Derwent Abstract Accession No. 85-239485/39, Aug. 15, 1985.

Derwent Abstract Accession No. 88-254402/36, Aug. 1, 1988.

Derwent Abstract Accession No. 92-352907/43, Sep. 9, 1992.

Qisheng Huo et al., *Generalized Synthesis of Periodic Surfactant/Inorganic Composite Materials*, Letters to Nature, vol. 368, Mar. 24, 1994, pp. 317-321.

H.Y. Zhu et al., *Engineering the Structures of Nanoporous Clays with Micelles of Alkyl Polyether Surfactants*, Langmuir 2001, vol. 17, Jan. 2001, pp. 588-594.

* cited by examiner

METHOD OF MAKING METAL OXIDE NANOPARTICLES IN AN EXFOLIATED SILICATE FRAMEWORK

FIELD OF THE INVENTION

THIS INVENTION relates to metal oxide nanoparticles in an exfoliated laponite framework, methods of producing and uses of same. More particularly but not exclusively, the invention relates to the method of producing transition metal oxide nanoparticles in an exfoliated laponite framework and their use as catalysts, catalyst supports, adsorbents and/or in photoelectronics and electromagnetics.

BACKGROUND OF THE INVENTION

Fine particles of transition metal oxides, in the several nanometer range, are of particular interest for their potential use in photoelectronics, electromagnetics and as catalyst, catalyst supports and adsorbents. Typically transition metal oxides in this several nanoparticle range are in the form of fine powders and whilst their powdery nature increases the particle surface area they are subject to agglomeration which affects their general performance. Furthermore these fine powders are very hard to recover when used in aqueous systems, thus leading to a potential difficulty in downstream separation.

Various new techniques have been adopted to develop solids of large metal oxide surface area. Antonelli, D. M. and Ying, J. Y., *Angew. Chem., Int.Ed. Engl.,* 1995, 34(18), 2014–2017 and Yang, P. et al, *Nature* 1998, 396, 152–165 described the formation of $TiO_2$ mesoporous molecular sieves have been synthesised by templated synthesis. Kresge, C. T., et al, *Nature,* 1992,359,710–712 and Inagaki, S, et al, *J. Chem. Soc. Chem. Commun.,* 1993, 680–682 earlier described the synthesis of mesoporous silica or aluminosilicate. Some approaches, such as starting with metal alkoxides and conducting the synthesis in non-aqueous systems, were employed to overcome serious difficulties in the synthesis, such as those reported in Antonelli, D, M, and Ying, J. Y., *Angew Chem Int Ed Engl,* 1995, 34(8), 2014–2017. However these processes still did not provided products with suitable pore size and surface areas.

In response to the desire to develop materials with larger pore sizes than zeolites, a class of thermally stable porous materials, pillared layered clays (PILCs) were developed from swellable layered clays, such as smectite, in the late 1970s. Numerous references describe the process, mechanism and properties of PILC's, for example Brindley, G. W. and Semples, R. E., *Clay Miner,* 1977, 12, 229. It is well understood that when dispersed in water, the layered clays swell because of hydration of the interlamellae cations which act as counterions to balance the negative charges of clay layers, which in turn allows inorganic polycations, the so-called pillar precursors, to be intercalated into the interlayer gallery by cation exchange. During subsequent heating above 400° C., the intercalated polycations are converted to oxide pillars, which prop the clay layers apart. A permanent micropore system is thus formed. Whilst pillaring has become a well-established technique for the synthesis of porous materials the materials produced are limited to microporous solids of a moderate porosity (typical characteristics being, pore volume of 0.15–0.40 $cm^3/g$ and BET surface area of 150–450 $m^2/g$), such as those described by Burch, R. Ed, *"Pillared clays, Catalysis Today"*, Elsevier: New York, 1998, Vol 2 and Mitchell, I. V., Ed. *"Pillared layered structures, current tends and applications"*, Elsevier Applied Science, London 1990. As the pore size is limited by the formation of pillars, which in turn are limited by the size of the cations being incorporated into the clay structure, it is extremely difficult to obtain large pillar precursors that are identical in size, and result in a catalyst having very high porosity.

Galameau, A., et al., *Nature,* 1995, 374, 529, reported a successful synthesis of mesoporous solids termed as porous clay heterostructures (PCHs) from layered clays using quaternary ammonium surfactants as template agents. Layered clays were first intercalated with surfactants, tetraethoxide orthosilicate (TEOS), were allowed to hydrolyze and condense, surrounding the intercalated surfactants in the galleries of the clay particles. An open framework of silica formed within the clay layers after removal of the surfactants by heating. Products of this method however have poor porosity characteristics. In the formation of the PCHs the water content present needs to be carefully controlled to ensure that the TEOS is allowed to hydrolyse rendering the product outcome somewhat uncertain.

Suzuki, K. and Mari. T., *Appl. Catal.,* 1990, 63, 181; Suzuki, K. et al., *J. Chem. Soc.,Chem. Commum.,* 1991, 873 and Michot, L. and Pinnavala, T. J., *Chem. Mater.* 1992, 4 (6), 1433, describe the use of poly(vinylalcohol) (PVA) or alkyl polyether surfactants in the synthesis of aluminium pillared layered clays (Al-PILCs), which resulted in significant changes in the pore structure of the products. The Al-PILC prepared in the presence of PVA however have poor long-range order, and a relatively large pore volume, which mainly arises from mesopores. The PILC catalyst structures of the prior art, the clay layer remains intact while the pillar precursors intercalate into the clay layers by means of ion exchange processes which result in layered clays with a typical diameter of 1–2 µm.

Whilst surfactants have been used to form a templates within catalyst or nanoparticle structures, all the methods of the prior art have suffered one or more limitations, including uncontrollable pore size, limited pore size range, poor porosity characteristics, the clay layers exhibit short range order, and/or their catalytic act is adversely effected when subject to high temperatures. The metal oxide nanoparticles in an exfoliated laponite framework when produced by the method of the invention show surprisingly good porosity characteristics and/or resistance to the effects of high temperatures.

DISCLOSURE OF THE INVENTION

In one form of the invention, although it need not be the only or indeed the broadest form, the invention resides in a method of producing metal oxide nanoparticles in an exfoliated laponite framework comprising the steps of:

forming an aqueous exfoliated laponite suspension having high pH, by mixing a layered clay into water until clear;

forming an acidic hydrated metal species precursor solution by dissolving one or more transitional metal salts;

adding a non-ionic surfactant and the hydrated metal species precursor solution to the aqueous exfoliated laponite suspension to form a product precursor;

ageing to precipitate a product precursor;

separating and washing the product precursor; and calcining the product precursor to form metal oxide nanoparticles in an exfoliated laponite framework.

Preferably, the non-ionic surfactant is selected from Tergitol 15S-5, Tergitol 15S-7, Tergitol 15S-9, Tergitol 15S-12 or Tergitol 15S-30.

The transition metal salts are preferably selected from one or more of aluminium chloride; aluminium nitrate; aluminium hydroxychloride; ferric chloride; ferric nitrate; cerium chloride, lanthanum chloride; zirconium chloride; zirconium oxychloride; titanium (IV) isopropoxide, titanium chloride; chromium chloride.

Preferably, the aqueous exfoliated laponite suspension is formed by adding approximately 1 g laponite, per 50 mls water, and stirring until clear.

Suitably, 2 to 20 g of the nonionic surfactant is added per 200 ml of aqueous exfoliated laponite suspension.

The ageing step, is preferably achieved by subjecting the solution temperatures between 100° C. and 700° C. over a period of between one to three days.

Suitably, the calcining step is carried out at temperatures between 500° C. and 1100° C., for periods of up to or about 20 hours.

In another form of the invention, there is provided metal oxide nanoparticles in an exfoliated laponite framework wherein the metal ion of the metal oxide is selected from one or more of titanium, zirconium, aluminum, cerium, lathanum, iron, nickel and chromium.

In another form the invention provides metal oxide nanoparticles in an exfoliated laponite framework having characteristics selected from two or more of the following:
a. pore size between 3 and 9 nm;
b. surface area between 500 and 900 $m^2/g$;
c. thermal stability at temperatures equal to or greater than about 500° C.; or
d. metal oxide nanoparticles particle size between 3 and 9 nm.

Preferably the metal oxide nanoparticles in the exfoliated laponite framework has characteristics selected from a surface area between 500 and 900 $m^2/g$ and metal oxide nanoparticles particle size between 3 and 9 nm; or a pore size between 3 and 9 nm, a surface area between 500 and 900 $m^2 g$ and a thermal stability at temperatures equal to or greater than about 500° C.

In yet another form, the invention provides for an adsorbent comprising metal oxide nanoparticles in an exfoliated laponite framework, comprising metal oxide nanoparticles in an exfoliated laponite framework,
having a surface area between 500 and 900 $m^2/g$ and metal oxide nanoparticles particle size between 3 and 9 nm.

In still another form, the invention provides an photocatalyst comprising metal oxide nanoparticles in an exfoliated laponite framework having a pore size between 3 and 9 nm, surface area between 500 and 900 $m^2/g$ and thermal stability at temperatures equal to or greater than about 500° C.

The inventors have found that the metal oxide nanoparticle in an exfoliated laponite framework, unlike the PCHs and PILCs of the prior art, have no structure order and the metal oxide nanoparticles are linked and separated by silica pieces. The pore size of the metal oxide particles in the exfoliated laponite framework are typically 3 nm as opposed to 1–3 nm for the pillared clays, such as that produced by Suzuki supra. Furthermore it has been found that the method of the invention can be used for a variety of metal oxides rather than being applicable to only one metal oxide, such as the work reported by Suzuki supra only being applicable to alumina pillared clays.

Without wanting to be bound to a particular theory the inventors believe that the advantage achieved by the method of the invention is due in part to the reaction of the high pH synthetic clay suspension and the low pH of the precursor solution of hydrated metal species resulting in additional hydrolysis of the metal species. Furthermore it is believed that the clay is subjected to acid leaching by the precursor solution which leads to the clay loosing its original composition and structure, resulting in an amorphous silicate. It has been found that the clay particles and metal hydrates species have a high affinity to the non-ionic surfactant, which can be used to tailor the structure of the product. It also appears that the non-ionic surfactants act by separating the hydrolyzed species of metal elements, preventing them from further agglomeration and sintering during the drying and heating steps. During the heating process the non-ionic surfactant is volatilized, leaving a rigid structure of metal oxide nanoparticles incorporated into an exfoliated laponite framework, having high porosity.

EXAMPLES

For convenience the subsequent examples will refer to the metal oxide nanoparticles in an exfoliated laponite framework as metal oxide-laponites, for example titanium oxide nanoparticles in an exfoliated laponite framework will be referred to as titanium oxide-laponite or $TiO_2$-Laponite, or metal oxide nanocomposites.

Example 1

Alumina-Laponite
Materials: The clay was Laponite RD, supplied by Fernz Specialty Chemicals, Australia. The clay powder has a BET specific surface area of 370 $m^2/g$ and a cation exchange capacity (CEC) of 55 mequiv/100 g of clay.

A commercial solution of aluminum hydroxychloride (Locron L from Hoechst, Germany) was used as the alumina source. It contains polyoxycations of aluminum hydrate with an $Al_2O_3$ content of 23.5+0.5 wt %, a ratio of OH/Al of 2.5, and a pH of about 3.5–3.7.

Four nonionic PEO surfactants, Tergitol 15S-n (n=5, 7, 9, and 12) from Aldrich, were used. The PEO surfactants have general chemical formula of $C_{12-14}H_{25-28}O(CH_2CH_2O)_nH$ and an average molecular weight of 420 for Tergitol 15S-5 (n=5) and of 730 for Tergitol 15S-12 (n=12).

Preparation of Alumina-Laponite Samples.

A 4.09 sample of Laponite was dispersed in 200 ml of water. The suspension was stirred until it became clear. Polyethylene oxide surfactant Tergitol 15-S-n, was added to the Laponite suspension. The amount of surfactant was varied from 0 to 20 g, and the different surfactants (n=5, 7, 9 and 12) were used to obtain a range of samples.

The suspension was stirred for 2 h to allow sufficient mixing. To this mixture was added 20 mL of the Locron L solution dropwise with continuous stirring. The suspension was then transferred to an autoclave after being stirred for 2 h and maintained at 100° C. for 2 days. A white precipitate was recovered from the mixture by centrifuging and washed with deionized water until it was free of chlorine (Cl$^-$) ions. The wet cake was dried in air and calcined at 500° C. for 20 h. The temperature was raised at a rate of 2° C./min. The PEO surfactants were evaporated in the temperature range between 100° C. and 250° C. The surfactants can be collected in a cooling trap during this stage and reused.

$N_2$ adsorption-desorption isotherms were measured at liquid nitrogen (−196° C.) after a degassing period of 16 h at 230° C. The BET specific surface area, surface area, pore volume and mean diameter of the framework pores (pores formed in the galleries between the clay layers) in the calcined alumina intercalated laponite samples were derived from the data of the isotherms and summarized in Table 1 and 2. In Table 1, m indicates the amount of surfactant, Tergitol TS-15-9, introduced in the synthesis of the alumina—laponite nanocomposite.

TABLE 1

Surface area, pore volume and mean diameter of the framework pores in the calcined alumina-laponite nanocomposite samples.

| Samples | $S_{BET}(m^2/g)$ | $V_p(cm^3/g)$ | $d_p(nm)^a$ |
|---|---|---|---|
| m = | | | |
| 20 | 531 | 0.925 | 7.4 |
| 12 | 495 | 0.652 | 5.5 |
| 8 | 542 | 0.709 | 5.4 |
| 6 | 499 | 0.641 | 5.3 |
| 4 | 437 | 0.530 | 4.9 |
| 2 | 417 | 0.405 | 4.3 |
| 0 | 278 | 0.233 | 3.5 |
| 10 (alumina prepared without Laponite) | 239 | 0.631 | 10.6 |

$^a d_P$ the mean diameter of the framework pores is hydraulic diameter, derived from the ratio of pore volume to pore surface area.

TABLE 2

Surface area, pore volume and mean diameter of the framework pores in the calcined alumina-laponite nanocomposite samples prepared with different PEO surfactants. The amount of the surfactant used is in the synthesis is 8.0 g

| Samples | $S_{BET}(m^2/g)$ | $V_p(cm^3/g)$ | $d_p(nm)$ |
|---|---|---|---|
| Tergitol 15-S-5 | 557 | 1.162 | 9.2 |
| Tergitol 15-S-7 | 545 | 0.752 | 5.7 |
| Tergitol 15-S-9 | 542 | 0.709 | 5.4 |
| Tergitol 15-S-12 | 514 | 0.559 | 4.5 |

Alumina intercalated laponites prepared by the process of the invention and example 1, and further characterized were published by the inventors in "Engineering the Structures of Nanoporous Clays with Micelles of Alkyl Polyether Surfactants", *Langmuir* 2001, 17, 588–594, published on Jan. 6, 2001 and herein wholly incorporated by reference.

Further characterization and comparison data for alumina nanoparticles in exfoliated laponite appears below at example 10.

Example 2

Titanium Dioxide-Laponite

A laponite suspension was prepared as in Example 1. PEO surfactants, Tergitol 15-S-n, were added into the suspension. The amount of the surfactant was varied from 0 to 20 g, and the different surfactants (n=5, 7, 9 and 12) were used to obtain a range of samples.

The titanium hydrate sol was used as the $TiO_2$ source. The sol was prepared from 12.9 g of titanium (IV) isopropoxide, $Ti[OCH(CH_3)_2]_4$ and 176 ml of 1.0M HCl. It was then added dropwise into the mixture of surfactant and laponite suspension with continuous stirring. After prolonged stirring of 3 hours, the mixture was transferred into an autoclave and kept at 100° C. for two days. White precipitate was recovered from the mixture by centrifuging and washing with deionised water until it was free of Cl$^-$ ions. The wet cake was dried in air and calcined at the same conditions as in Example 1.

$N_2$ adsorption-desorption isotherms were measured in a similar manner to Example 1. The BET specific surface area, surface area, pore volume and mean diameter of the framework pores (pores formed in the galleries between the clay layers) are listed in Table 3. In Table 3, m indicates the amount of the surfactant, Tergitol 15-S9 used in preparing the samples.

TABLE 3

Surface area, pore volume and mean diameter of the framework pores in the calcined $TiO_2$-laponite nanocomposite samples.

| Samples | $S_{BET}(m^2/g)$ | $V_p(cm^3/g)$ | $d_p(nm)^a$ |
|---|---|---|---|
| m = | | | |
| 0 | 343 | 0.406 | 5.9 |
| 2 | 479 | 0.441 | 4.4 |
| 4 | 534 | 0.497 | 4.8 |
| 8 | 635 | 0.776 | 5.9 |
| 12 | 550 | 0.525 | 4.8 |
| 20 | 464 | 0.450 | 5.3 |

$^a d_P$ the mean diameter of the framework pores is hydraulic diameter, derived from the ratio of pore volume to pore surface area.

Photodegradation of Rhodamine 6G

The UV source was a 100W Hg lamp, Toshiba SHLS-1002A. Aqueous suspensions of Rhodamine 6G (usually 25 ml) and TiO2 nanoparticles in an exfoliated silicate framework (25 mg) were placed in a Pyrex vessel. $TiO_2$ nanoparticle of 3.9, 4.4, 5.5 and 6.2 nm where prepared using a method similar to that described above with the pH of the solution varied. Prior to irradation, the suspensions were magnetically stirred in the dark for ca. 30 min to establish an adsorption/desorption equilibrium between the dye and the $TiO_2$ particle surface. At given intervals of illumination, a sample of the $TiO_2$ particulates were collected, centrifuged and then filtered thorough a millipore filter. The filtrates were analysed by UV-VIS spectroscopy using lambda Bio 20 spectrophotometer.

Figure 1A:
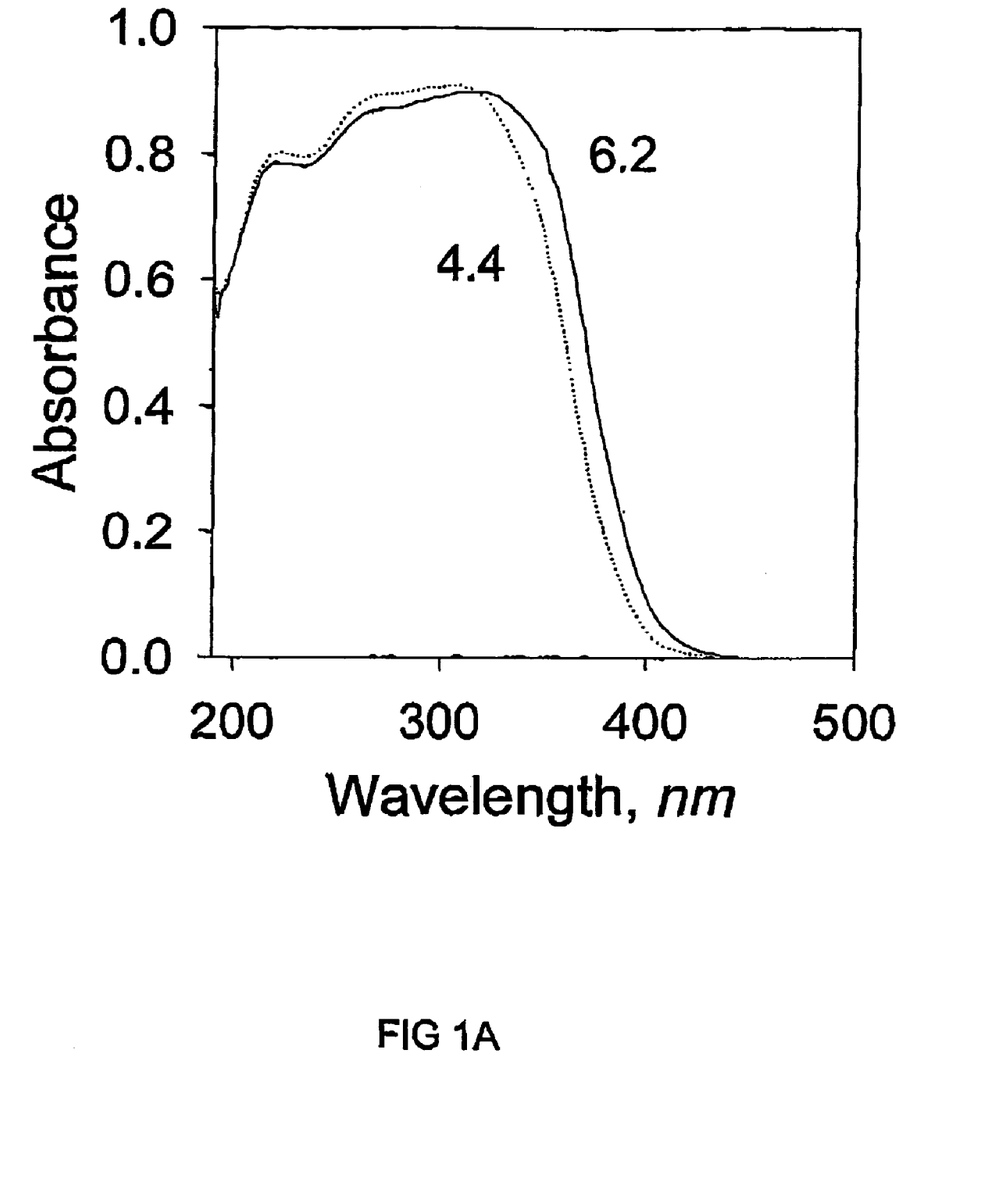
FIGS. 1A and B. UV-V is spectra for $TiO_2$-laponite
Figure 1B:
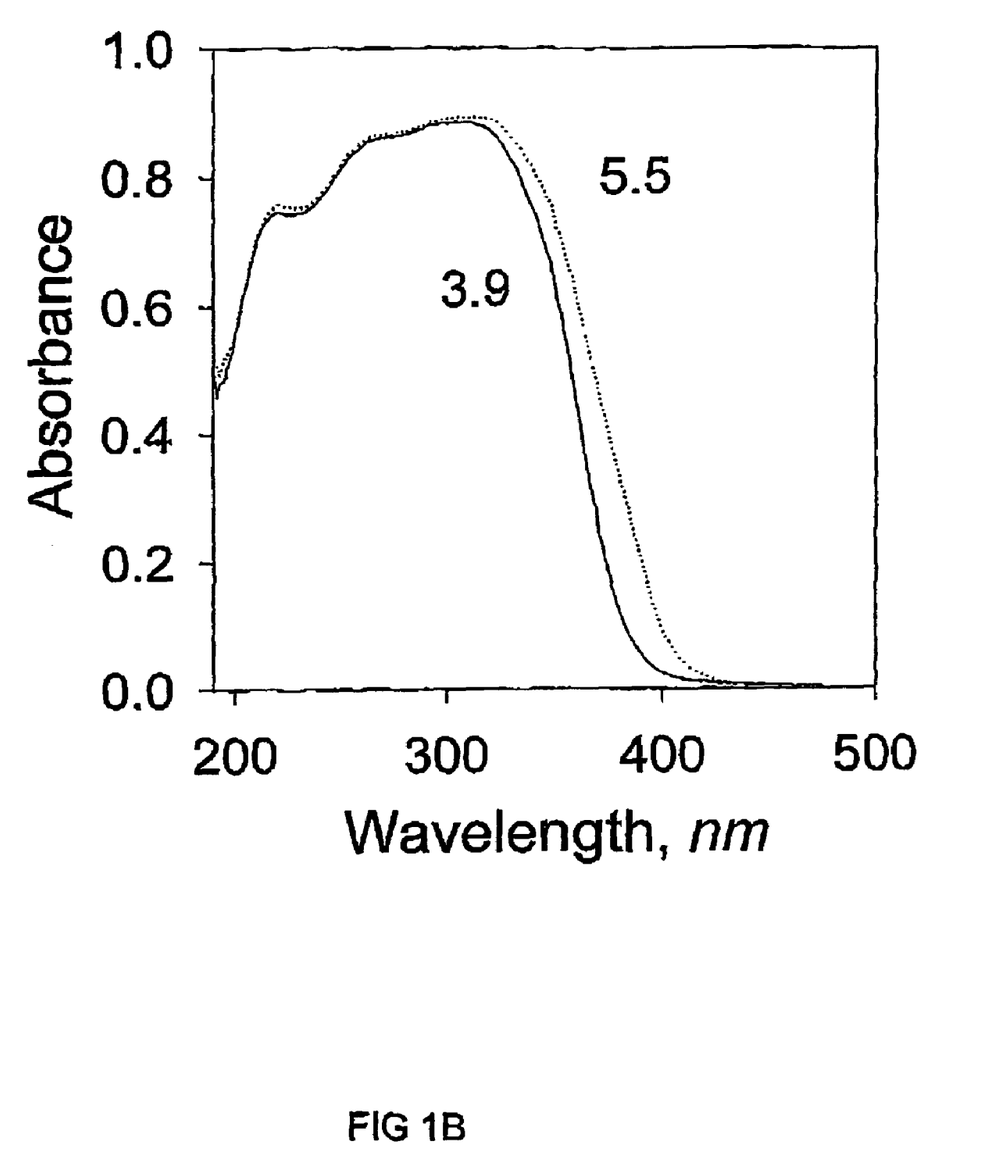

Comparing the DR-UV-VIS spectra of the samples FIGS. 1A and 1B, it was found that absorbance of UV light by the sample with smaller anatase particle sizes occurs at the shorter wavelength, so called blue shift. The blue shift is consistent with the variation in the anatase particle size of the samples.

Larger species of the precursors of $TiO_2$ nanoparticles were formed and condense to the acid-leached silicate layers. Introducing PEO surfactants in the synthesis significantly increased the porosity and surface areas in the composite solids. The $TiO_2$ exists in anatase nano-particles, separated by voids and silicates platelets, and are accessible to organic molecules. The composite solids exhibited superior properties as photo-catalysts for degradation of Rhodamine 6G in aqueous solution.

The products of this example may be used for odour elimination of drinking water, degradation of harmful organic contaminants, like herbicides, pesticides, refractive dyes, and oil spills in surface water systems.

Further characterisation and comparison data for titanium oxide nanoparticles in exfoliated laponite appears below at example 10.

Example 3

Zirconium Dioxide-Laponite

A laponite suspension was prepared as in Example 1. PEO surfactants, Tergitol 15-S-n, were added into the suspension. The amount of the surfactant was varied from 0 to 20 g, and the different surfactants (n=5, 7, 9 and 12) were used to obtain a range of samples.

An aqueous solution of $ZrOCl_2$, from 32.23 g of $ZrOCl_2.8H_2O$ and 200 ml water, was refluxed for 1 hour and used as the $ZrO_2$ source. It was then added drop wise into the mixture of surfactant and laponite suspension with continuous stirring. After prolonged stirring of 3 hours, the mixture was transferred into an autoclave and kept at 100° C. for two days. White precipitate was recovered from the mixture by centrifuging and washing with deionised water until it was free of $Cl^-$ ions. The wet cake was dried in air and calcined at the same conditions as in Example 1.

$N_2$ adsorption-desorption isotherms were measured in a similar manner to Example 1. The BET specific surface area, surface area, pore volume and mean diameter of the framework pores (pores formed in the galleries between the clay layers) are listed in Table 4. In Table 4, m indicates the amount of the surfactant, Tergitol 15-S-9 used in preparing the samples

TABLE 4

Surface area, pore volume and mean diameter of the framework pores in the calcined $ZrO_2$-laponite nanocomposite samples.

| Samples | $S_{BET}(m^2/g)$ | $V_p(cm^3/g)$ | $d_p(nm)^a$ |
|---|---|---|---|
| m = | | | |
| 0 | 211 | 0.174 | 3.3 |
| 2 | 401 | 0.401 | 4.0 |
| 4 | 391 | 0.360 | 3.6 |
| 8 | 459 | 0.430 | 3.9 |
| 12 | 465 | 0.406 | 3.6 |
| 20 | 304 | 0.377 | 4.4 |

$^a d_p$ the mean diameter of the framework pores is hydraulic diameter, derived from the ratio of pore volume to pore surface area.

Further characterisation and comparison data for zirconium oxide nanoparticles in exfoliated laponite appear below at example 10.

With large metal oxide surface area and porosity, good thermal and chemical stability, these materials have been found to be superior support for advance catalysts. Nickel catalysts supported on Zr-laponite exhibit a great long-term stability for methane reforming with carbon dioxide with high conversion rate, compared with the conventional nickel catalyst on alumina support, discussed in further detail in Example 9.

Example 4

Iron Oxide-Laponite

The laponite suspension was prepared in a similar manner as in Example 1. 8.0 g of Terigol 15-S-9 was added into the suspension. A 0.2M Iron(III)nitrate solution $[Fe(NO_3)_3]$, from 17.8 g of iron nitrate, $[Fe(NO_3)_3.9H_2O]$ and 213 ml of deionised water was mixed with 2.33 g of sodium carbonate, $Na_2CO_3$ under vigorously stirring. The molar ratio of $[Na_2CO_3]/[Fe^{3+}]$ was 1:1.

After prolonged stirring of 3 hours, this solution was added dropwise into the mixture of surfactant and laponite suspension with continuous stirring. The mixture was stirred for 3 hours. The precipitate was recovered from the mixture by centrifuging and washing with deionised water until it was free of $Cl^-$ ions. The wet cake was dried in air and calcined at 250° C. for 20 hours. Temperature was raised at a rate of 2° C./min.

$N_2$ adsorption-desorption isoterms were measured in a similar manner to Example 1. The BET specific surface area, surface area, pore volume and mean diameter of the framework pores (pores formed in the galleries between the clay layers) are listed in Table 5. In Table 5, m indicates the amount of the surfactant, Tergitol 15-S-9 used in preparing the samples

TABLE 5

Surface area, pore volume and mean diameter of the calcined $Fe_2O_3$-laponite samples.

| Samples | $S_{BET}(m^2/g)$ | $V_p(cm^3/g)$ | $d_p(nm)^a$ |
|---|---|---|---|
| m = | | | |
| 0 | 419 | 0.3066 | 2.9 |
| 8 | 472 | 0.5467 | 5.0 |

$^a d_p$ mean diameter of the framework pores is hydraulic diameter, derived from the ratio of pore volume to pore surface area.

Further characterisation and comparison data for iron oxide nanoparticles in exfoliated laponite appears below at example 10.

Example 5

Chromium Oxide-Laponite

The laponite suspension was prepared in a similar manner as in Example 1. 8.0 g of Terigol 15-S-9 was added into the suspension. A 0.1M chromium(III)nitrate solution $[Cr(NO_3)_3]$, from 17.6 g of chromium nitrate, $[Cr(NO_3)_3.9H_2O]$ and 213 ml of hot water (95° C.) was mixed with 4.66 g of sodium carbonate, $Na_2CO_3$ under vigorously stirring. The molar ratio of $[Na_2CO_3]/[Cr^{3+}]$ was 2:1. The solution thus obtained was aged at 95° C. for 6 hours. This solution was added drop-wise into the mixture of surfactant and laponite suspension with continuous stirring. The mixture was stirred for 3 hours. The precipitate was recovered from the mixture by centrifuging and washed with deionised water 3 times. The wet cake was dried in air and calcined at 350° C. for 20 hours. Temperature was raised at a rate of 2° C./min.

$N_2$ adsorption-desorption isotherms were measured in a similar manner to Example 1. The BET specific surface area, surface area, pore volume and mean diameter of the framework pores (pores formed in the galleries between the clay layers) are listed in Table 6. In Table 6, m indicates the amount of the surfactant, Tergitol 15-S-9 used in preparing the samples.

TABLE 6

Surface area, pore volume and mean diameter of the calcined $Cr_2O_3$-laponite nanocomposite samples.

| Samples | $S_{BET}(m^2/g)$ | $V_p(cm^3/g)$ | $d_p(nm)^a$ |
|---|---|---|---|
| m = | | | |
| 0 | 240 | 0.2062 | 3.4 |
| 8 | 446 | 0.6262 | 5.6 |

$^a d_p$ the mean diameter of the framework pores is hydraulic diameter, derived from the ratio of pore volume to pore surface area.

Further characterisation and comparison data for chromium oxide nanoparticles in exfoliated laponite appears below at example 10.

Example 6

Mixed Oxides of Cerium and Aluminium-Laponite

The laponite suspension was prepared in a similar manner as in Example 1. PEO surfactants, Terigol 15-S-9, was added into the suspension. The amount of the surfactant was varied from 0 to 20 g, to obtain a range of samples. A mixture solution of $CeCl_3$ and Lacron L, from 3.5 g of $CeCl_3.7H_2O$, 20 ml of Locron L solution and 26 ml of water stirred for 2 hours and then transferred in to an autoclave and kept at 120° C. for 100 hours. This solution was added drop-wise into the mixture of surfactant and laponite suspension with continuous stirring. After prolonged stirring of 2 hours, the mixture is transferred into an autoclave and kept at 100° C. for two days. The precipitate was recovered from the mixture by centrifuging and washed with deionised water until it is free of Cl⁻ ions. The wet cake was dried in air and calcined at 500° C. for 20 hours. Temperature was raised at a rate of 2° C./min.

$N_2$ adsorption-desorption isotherms were measured in a similar manner to Example 1. The BET specific surface area, surface area, pore volume and mean diameter of the framework pores (pores formed in the galleries between the clay layers) are listed in Table 7. In Table 7, m indicates the amount of the surfactant, Tergitol 15-S-9 used in preparing the samples

TABLE 7

Surface area, pore volume and mean diameter of the calcined $CeO_2/Al_2O_3$-laponite samples.

| Samples | $S_{BET}(m^2/g)$ | $V_p(cm^3/g)$ | $d_p(nm)^a$ |
|---|---|---|---|
| m = | | | |
| 0 | 422 | 0.324 | 3.1 |
| 4 | 562 | 0.6767 | 4.8 |
| 8 | 599 | 0.755 | 5.3 |
| 12 | 589 | 0.7222 | 4.9 |

$^a d_p$ the mean diameter of the framework pores is hydraulic diameter, derived from the ratio of pore volume to pore surface area.

Further characterisation and comparison data for cerium oxide/alumina nanoparticles in exfoliated laponite appears below at example 10.

Example 7

Mixed Oxides of Lanthanum and Aluminium-Laponite

The laponite suspension was prepared in a similar manner as in Example 1. PEO surfactants, Terigol 15-S-9, were added into the suspension. The amount of the surfactant was varied from 0 to 20 g, to obtain a range of samples. A mixture solution of $LaCl_3$ and Locron L, from 3.5 g of $LaCl_3.7H_2O$, 20 ml of Locron L solution and 26 ml of water stirred for 2 hours and then transferred in to an autoclave and kept at 120° C. for 100 hours. This solution was added drop-wise into the mixture of surfactant and laponite suspension with continuous stirring. After prolonged stirring of 2 hours, the mixture is transferred into an autoclave and kept at 100° C. for two days. The precipitate was recovered from the mixture by centrifuging and washed with deionised water until it is free of Cl⁻ ions. The wet cake was dried in air and calcined at 500° C. for 20 hours. Temperature was raised at a rate of 2° C./min.

$N_2$ adsorption-desorption isoterms were measured in a similar manner to Example 1. The BET specific surface area, surface area, pore volume and mean diameter of the framework pores (pores formed in the galleries between the clay layers) are listed in Table 8. In Table 8, m indicates the amount of the surfactant. Tergitol 15S-9 used in preparing the samples

TABLE 8

Surface area, pore volume and mean diameter of the calcined $LaO_2/Al_2O_3$-laponite samples.

| Samples | $S_{BET}(m^2/g)$ | $V_p(cm^3/g)$ | $d_p(nm)^a$ |
|---|---|---|---|
| m = | | | |
| 0 | 438 | 0.321 | 2.9 |
| 8 | 587 | 0.636 | 4.3 |

$^a d_p$ the mean diameter of the framework pores is hydraulic diameter, derived from the ratio of pore volume to pore surface area.

Example 8

Mixed Oxides of Cerium and Zirconium-Laponite

The laponite suspension was prepared in a similar manner as in Example 1. 8.0 g Terigol 15-S-9, was added into the suspension. A mixture solution of $CeCl_3$ and $ZrOCl_2$, from 1.8 g of $CeCl_3.7H_2O$, 16.1 g $ZrOCl_2.7H_2O$ and 100 ml water, was stirred for half an hour and then transferred into an autoclave and kept at 100° C. for two days. The precipitate was recovered from the mixture by centrifuging and washed with deionised water until it is free of Cl⁻ ions. The wet cake was dried in air and calcined at 500° C. for 20 hours. Temperature was raised at a rate of 2° C./min.

$N_2$ adsorption-desorption isotherms were measured in a similar manner to Example 1. The BET specific surface area, surface area, pore volume and mean diameter of the framework pores (pores formed in the galleries between the clay layers) are listed in Table 9. In Table 9, m indicates the amount of the surfactant, Tergitol 15-S-9 used in preparing the samples.

TABLE 9

Surface area, pore volume and mean diameter of the calcined $CeO_2/ZrO_2$-laponite samples.

| Samples | $S_{BET}(m^2/g)$ | $V_p(cm^3/g)$ | $d_p(nm)^a$ |
|---|---|---|---|
| m = | | | |
| 0 | 291 | 0.226 | 3.1 |
| 8 | 611 | 0.674 | 4.4 |

$^a d_p$ the mean diameter of the framework pores is hydraulic diameter, derived from the ratio of pore volume to pore surface area.

Example 9

Nickel/Zirconium Oxide Nanoparticle in an Exfoliated Laponite

A zirconium oxide nanopartilce in an exfoliated laponite, subsequently referred to as a Zr-laponite was prepared in a similar manner to that described in Example 3 above.

The Ni/Zr-laponite was prepared by the incipient wetness impregnation method with aqueous solution of nitrates as metal precursors. The solids were dried overnight in air at 105° C. and then calcined at 500° C. in air for 4 hours in order to realize the complete decomposition of the nitrate. After this treatment, the catalyst was reduced at 500° C. in a stream of 50% $H_2/N_2$ for 2 hours. The nickel metal loading of catalyst was 9 wt %, except where specially stated.

Catalytic performance

Catalytic reaction experiments were conducted in a vertical fixed-bed reactor made of quartz tube under atmospheric pressure. 0.2 g catalyst was placed in the quartz tube. A thermocouple was placed in the tube with one end touching on the catalyst in order to measure the bed temperature. The mixture of reactants of methane and carbon dioxide with ratio of 1:1 was fed into the reactor at the flow rate of 60 ml/min (GHSV=18000 ml/gh). The analyses of reactant/product mixtures were carried out using an on-line gas chromatograph (Shimadzu-17A) equipped with a thermal conductivity detector. A carbosphere (80–100 mesh) column was used to separate $H_2$, CO, $CH_4$ and $CO_2$. Prior to each reaction run, the catalyst was reduced in situ at 500° C. in 50% $H_2/N_2$ for 2 h. The activities of catalysts were investigated at temperatures between 500–800° C., and stability tests were conducted at a certain reaction temperature only.

Surface area and pore size of supports and catalysts

The surface areas and pore sizes of supports and catalysts were studied by nitrogen adsorption, and the results are listed in Table 10. The pillaring process greatly increases the surface area of these laponite materials. It was seen that when the amount of the introduced surfactant was increased, the surface area of Zr-Laponite increased, until the Zr-Laponite(12) with a 12 g amount of surfactant in the pillaring process, when its surface area decreased. This indicates that the surfactant amount of 12 g is more than enough in the pillaring process. All these supports are mesoporous and have higher surface areas than $\gamma$-$Al_2O_3$, of the prior art. The surface area order of supports is Zr-Laponite(8)>Zr-Laponite(12)>Zr-Laponite(4)>Zr-Laponite(0). The order of catalysts is similar to that of supports. The surface area of catalyst treated at 500° C. is higher than at 600° C. It is also seen that the surface area of catalysts is generally reduced for those with high porous structure.

TABLE 10

Variation in pore structure of Zr supports and Ni/Zr catalysts

| Sample | Surface Area $(m^2/g)$ | Pore Volume $(cm^3/g)$ | Pore Diameter (nm) | Pore Structure |
|---|---|---|---|---|
| Zr-Laponite (0) | 211.4 | 0.174 | 3.3 | Mesoporous |
| Zr-Laponite (4) | 390.8 | 0.360 | 3.7 | Mesoporous |
| Zr-Laponite (8) | 458.6 | 0.41 | 4.1 | Mesoporous |
| Zr-Laponite (12) | 435.9 | 0.413 | 3.8 | Mesoporous |
| $Al_2O_3$ | 112 | 0.286 | 10.3 | Mesoporous |
| Ni/Zr-Laponite (0) (500° C.) | 260.3 | 0.192 | 3.0 | Mesoporous |
| Ni/Zr-Laponite (0) (600° C.) | 227 | 0.169 | 3.0 | Mesoporous |
| Ni/Zr-Laponite (8) (500° C.) | 371.9 | 0.354 | 3.8 | Mesoporous |
| Ni/Zr-Laponite (8) (600° C.) | 350 | 0.34 | 3.7 | Mesoporous |
| Ni/Zr-Laponite (4) (500° C.) | 330 | 0.306 | 3.8 | Mesoporous |
| Ni/Zr-Laponite (12) (500° C.) | 356 | 0.337 | 3.8 | Mesoporous |
| 4.5% Ni/Zr-Laponite (8) (500° C.) | 371.8 | 0.351 | 3.8 | Mesoporous |
| Ni/$Al_2O_3$ | 118 | 0.230 | 7.8 | Mesoporous |

Catalytic activity

Figure 2:
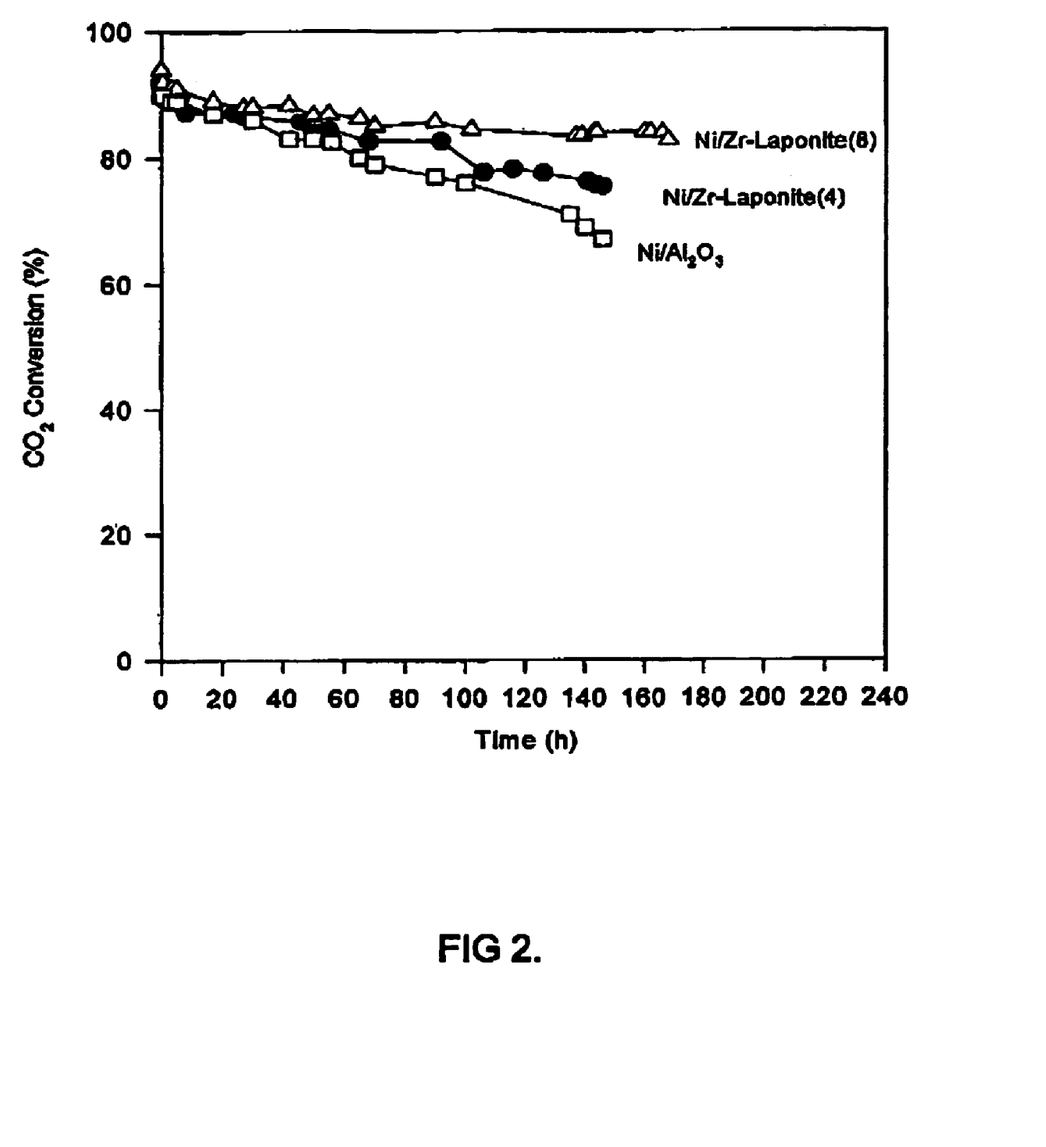
FIG. 2. Comparison of catalytic performance of various Ni/$ZrO_2$-laponites

These $ZrO_2$-laponite composites were used as supports to prepare supported Ni catalysts for methane reforming with carbon dioxide. These catalysts exhibited high conversion and good stability, maintaining the high activity for over 170 hours at an operating temperature of 1023K. While the nickel catalyst on conventional support of activated alumina ($Al_2O_3$) showed substantial deactivation. The performances of the catalysts supported on a nanocomposite and on an activated alumina are shown in FIG. 2.

Example 10

Metal Oxide Nanoparticles in Exfoliated Laponite

A number of metal oxide nanoparticle in exfoliated laponites framework were formed using methods similar to those described above. It was found that the porosity of the nanocomposite was significantly increased by introducing polyethylene oxide (PEO) surfactants of small molecular weights, with a general chemical formula $C_{12-14}H_{25-29}$ $O(CH_2CH_2O)_nH$ (n=5–12). These surfactants have strong affinities to the surfaces of clay and metal hydrates. Therefore, they have a function of separating the hydrolyzed species of metal elements, preventing them from further agglomeration and sintering during the drying and heating processes.

Kresge, C. T.; Leonowicz, M. E.; Roth, W. J.; Vartull, J. C.; Beck, J. S., Nature, 359, 710–712, 1992; Inagaki, S.; Fukushima, Y.; Kuroda, K. J. Chem. Soc. Chem. Commun., 680–682, (1993); and Huo, Q. et al.

Kresge, C. T.; Leonowicz, M. E; Roth, W. J.; Vartuli, J. C.; Beck, J. S., Nature, 359, 710–712, 1992; Inagaki, S.: Fukushima, Y.; Kuroda, K. J. Chem. Soc. Chem. Commun., 680–682, (1993); and Huo, Q. et al, Nature, 368, 317–321 (1994) reported that in the templated synthesis the pore size of the product is proportional to the molecular size of the surfactant. But there is no such a trend observed in the composites made by the method of the current invention. The molecular size of the surfactant is not a sole determinant of the pore size of the product solids. During heating the surfactant volatilizes, leaving a rigid structure with high porosity. The BET specific surface area and porosity data of some nanocomposite samples are given in Table 11.

TABLE 11

BET specific surface area (BET S.A.) and pore volume (Vp) of some metal oxide composite samples.

| Samples prepared with surfactant (PEO) | | | Samples prepared without surfactant | | |
|---|---|---|---|---|---|
| Metal oxide | BET S.A. ($m^2/g$) | Vp ($cm^3/g$) | Metal oxide | BET S.A. ($m^2/g$) | Vp ($cm^3/g$) |
| $Al_2O_3$— | 542 | 0.709 | $Al_2O_3$— | 278 | 0.233 |
| $Al_2O_3/La_2O_3$— | 587 | 0.676 | $Al_2O_3/La_2O_3$— | 439 | 0.383 |
| $Al_2O_3/CeO_2$— | 599 | 0.775 | $Al_2O_3/CeO_2$— | 422 | 0.345 |
| $ZrO_2$ | 459 | 0.430 | $ZrO_2$ | 248 | 0.146 |
| $ZrO_2/CeO_2$ | 611 | 0.676 | $ZrO_2/CeO_2$ | 291 | 0.185 |
| $TiO_2$— | 635 | 0.776 | $TiO_2$— | 343 | 0.405 |
| $Cr_2O_3$— | 670 | 0.461 | $Cr_2O_3$— | 894 | 1.124 |
| $Fe_2O_3$— | 434 | 0.547 | $Fe_2O_3$— | 419 | 0.307 | are microporous solids (pore size below 2 nm) with a moderate porosity,[1] while the nanocomposites are mesoporous solids. The structures of these two classes of solids are also profoundly different. The TEM images of the pristine laponite and three nanocomposites (as representatives) are given in FIG. 3.

Bundles of several clay platelets can be seen in the image of pristine laponite in FIG. 3a. They aggregate in a poor long-range order. For pillared clays, the clay layers were regarded as inert with respect to reaction and almost intact in term of chemical composition through pillaring process. The acid leaching may result in remarkable changes in composition and structure of the clay layers. The extent of the reaction varies substantially from clay to clay. FIG. 3b is the image of the sample prepared from a solution containing Keggin ions, $[Al_{13}O_4(OH)_{24}]^{7+}$, and the laponite dispersion, $Al_2O_3$-composite. In this solid, thin stringy structure of about 1 and 2 nm thickness are observed, which are singular and paired silicate platelets, respectively. It is noted that these platelets are entangled but with a separation in the nanometer range. This indicates that the platelets are intercalated with nanoparticles of alumina. The Keggin ion solution has a weak acidity (pH of 3.0–3.5), and there is no obvious acid leaching from the laponite platelets, according to the results of chemical composition of the sample (in Table 12). Substantial loss of magnesium that is in the clay layer is an indicative of the acid leaching. Thus, the laponite platelets remain intact, in terms of composition and framework structure. When a more acidic solution containing sol particles of titanium (IV) hydrate, was used, laponite platelets are obviously involved in reaction. Most of magnesium in the clay platelets was leached out (Table 2). The solids obtained after calcination at 500° C. contains mainly silica and titanium dioxide. X-ray powder diffraction pattern (not shown) indicates that $TiO_2$ exists in anatase phase and we can see the aggregation of crystallites with random orientations in FIG. 3c. The size of the anatase crystalites can be estimated from domains of regular texture in the image, being about 3–9 nm. Both the x-ray pattern and TEM image do not indicate any crystal form of silica or silicate although silica accounts for over 50% of the sample mass. The silica in the samples is more likely amorphous as reaction product of the laponite clay. Similar behaviors were observed for other transition metal oxide nanocomposites. Energy dispersing x-ray spectroscopy (EDS) was used to analyze the chemical compositions at different regions over a sample. At least 5 regions were taken for one sample and the average region size was about 15 nm in diameter. We found no obvious difference from region to region and the overall composition of the sample was uniform, for all the samples. This means that in these samples metal oxide particles homogeneously disperse in exfoliated silicate media.

The image in FIG. 3d provides more information on the structure of the reaction product derived from laponite. This solid was obtained from reaction of laponite suspension with a solution containing chromium hydroxyl ions. In this particular case, only a small amount of $Cr_2O_3$ is left in the product solid ($Cr_2O_3$ content below 1%), which contains about 80 wt % of silica and 6 wt % of MgO, meanwhile most of the Mg content in the original laponite has been leached out during the synthesis. This solid provides a clear picture of the residue from the original laponite after the reaction. The structure of this solid is strikingly different from that of the original laponite. Various holes ranging from 3–20 nm can be seen in the image. These irregular pores reveal that the laponite platelets were seriously attacked, not only at edges but also on the basal surface of the platelets, leaving a porous framework of silica.

TABLE 12

Figure 3:
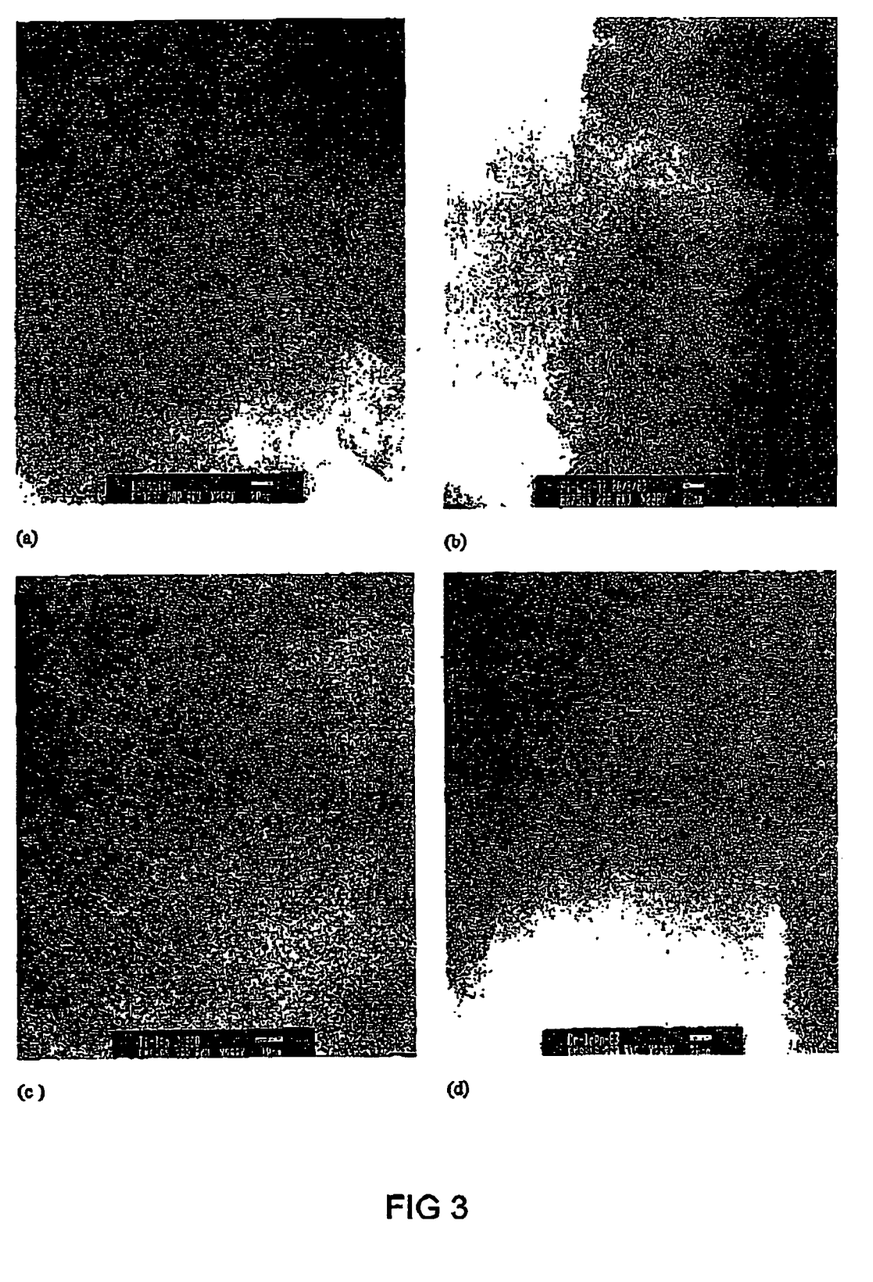
FIGS. 3A–D. TEM images of laponite clay and the calcined metal oxide composite samples. (a) laponite (b) $Al_2O_3$-composite (c). $TiO_2$-composite and (d) a $Cr_2O_3$-composite with low $Cr_2O_3$ content. The scale bars in the images indicate 20 nm.

Major chemical composition of the samples shown In FIG. 3.

| Sample | $SiO_2$ (%) | $Al_2O_3$ (%) | MgO (%) | $TiO_2$ (%) | $Na_2O$ (%) | $Fe_2O_3$ (%) | $Cr_2O_3$ (%) |
|---|---|---|---|---|---|---|---|
| Laponite | 51.10 | 0.07 | 23.20 | —* | 2.51 | — | — |
| $Al_2O_3$-composite | 41.49 | 27.91 | 17.38 | — | — | 0.04 | — |
| $TiO_2$-composite | 55.30 | 0.12 | 0.19 | 43.90 | — | 0.02 | — |
| $Cr_2O_3$-composite | 79.87 | — | 6.13 | — | — | 0.60 | 0.03 |

*Not detectable.

$^{29}Si$ magic angle spinning nuclear magnetic resonance ($^{29}Si$ MASNMR) of the samples (FIG. 4) also indicate the different structure change in silicate platelets caused by the reaction.

Figure 4:
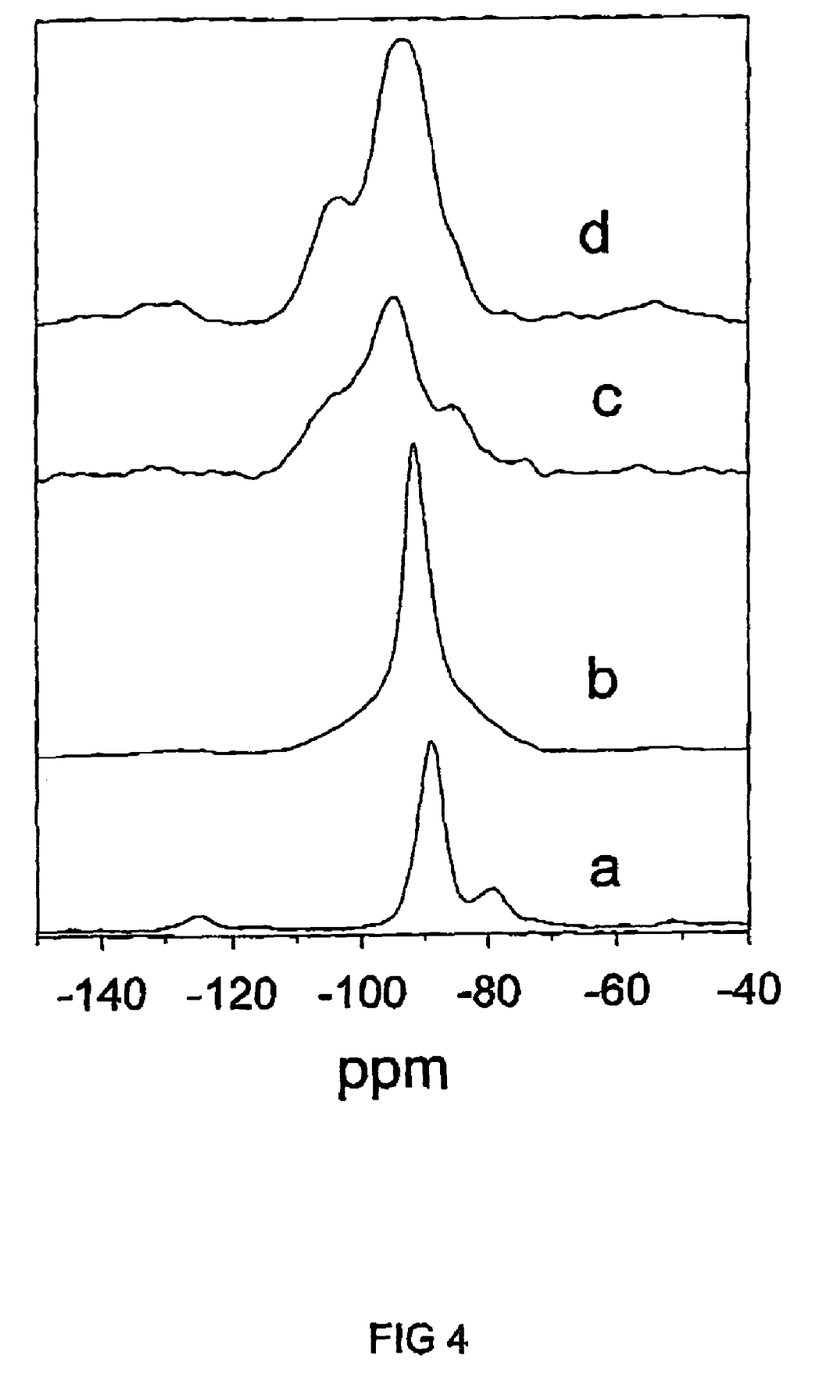
FIG. 4. $^{29}Si$ magic angle spinning nuclear magnetic resonance ($^{29}Si$ MASNMR) of the samples. a is the spectrum for laponite clay; b, for $Al_2O_3$-composite; c, for $TiO_2$-composite; and d, for the $Cr_2O_3$-composite with low $Cr_2O_3$ content.

$^{29}Si$ MASNMR spectrum of laponite displays two resonance peaks at −90 and −80 ppm (spectra a). Such chemical shifts are correlated to the $SiO_4$ tetrahedras linked with 3 and 2 other $SiO_4$ tetrahedras ($Q^3$ and $Q^2$ sites), respectively. This is expected for the structure of laponite clay layer. In the clay layer most $SiO_4$ tetrahedras are linked to 3 other $SiO_4$ tetrahedra, being in $Q^3$ sites but the tetrahedra at the edges of the clay layers are linked to 2 other $SiO_4$ tetrahedra and thus form the $Q^2$ sites. The smaller amount of $Q^2$ sites, compared with that of $Q^3$ sites, is responsible for the low intensity of the peak at −80 ppm.

The chemical shifts for the $Al_2O_3$-composite sample is similar to that of laponite, with a major resonance at −91.7 ppm (spectra b). This means that the clay platelets remain almost intact in the reaction, being consistent with our observation on the TEM image. The $TiO_2$-composite and $Cr_2O_3$-composite samples show substantially different MASNMR spectra. Broad resonance in the range from −110 to −80 ppm can be seen, reflecting poor short-range order. It also suggests a radical structure change of the silicate due to the reaction in the synthesis. The chemical shift at −104 ppm (a peak for $Cr_2O_3$-composite and a shoulder for $TiO_2$-composite) should be assigned to $Q^4$ sites where the $SiO_4$ tetrahedra linked with 4 other $SiO_4$ tetrahedra. In laponite clay structure there should be no $Q^4$ sites, and this is confirmed by the spectrum of the clay. Thus the $Q^4$ sites have resulted from the profound structure changes of the silicate in the synthesis.

These results suggest that the clay layers could be seriously attacked if the acidity of the precursor solution is strong. On the other hand, the laponite dispersion with a high pH inevitably induces further hydrolysis of the metal hydroxyl oligomers in the precursor solution, forming larger species, the precursors of metal oxide nanoparticles. These large species most likely condense to the surrounding silicate platelets, because they carry opposite electric charges. This leads to a composite structure in which metal oxide particles of several nanometers in size are dispersed among the exfoliated silicate media.

According to this mechanism, it is possible to alter the particle size of the metal oxides by manipulating the acidity of the precursor solution. Indeed, as we increased the $H^+/TI$ molar ratio of the precursor solution from 2.0 to 8.0, the mean size of anatase particle in the product $TiO_2$-composites increases from 3.7 to 9.0 nm. This finding is of significant importance, which allows us to effectively tailor the structure of these solids for various applications.

Figure 5:
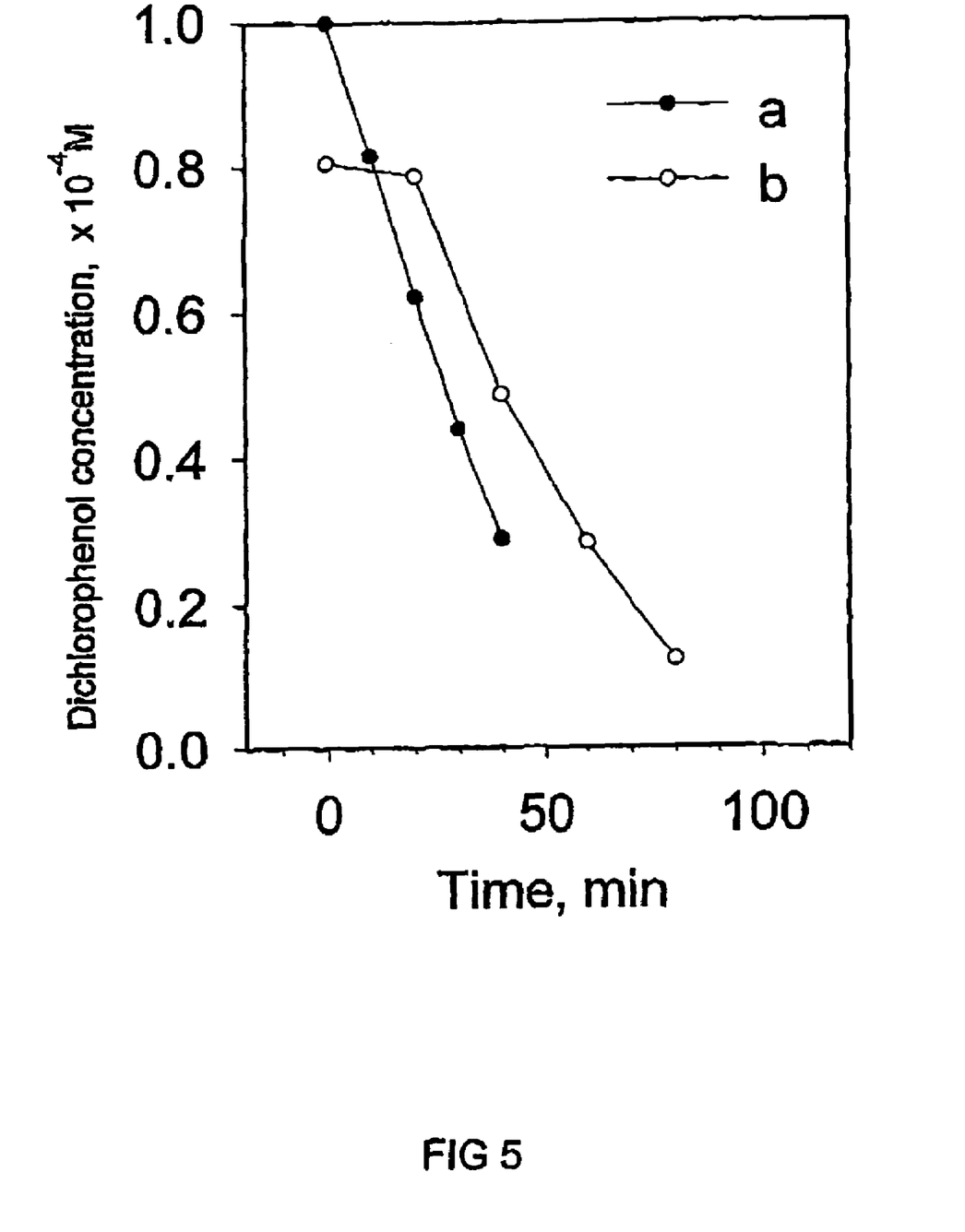
FIG. 5. Catalytic performance of the samples for photodegradation of 2,4-dichlorophenol. Curves a and b illustrate the performance of the ultra-fine $TiO_2$ powder P25 and a $TiO_2$-composite sample, respectively.

In FIG. 5 catalytic performances for photo-degradation of 2, 4-dicholorophenol by a $TiO_2$-composite and P25, a commercial ultra-fine titanium dioxide powder supplied by Degussa, are compared.

The overall photo-catalytic efficiency of the $TiO_2$-composite is comparable to that of P25, which is known to be the best commercial $TiO_2$ photo-catalyst and has a mean particles size of about 25 nm. The catalytic performance of the $TiO_2$-composite proves that most of the surface of $TiO_2$ crystals is accessible to the various molecules in solution. Furthermore, the $TiO_2$-composite contains about 45% of $TiO_2$. Therefore, the activity per mass of $TiO_2$ for the $TiO_2$-nanocomposite is superior. Besides, it is very difficult to recover P25 powder from water. This could leads to a potential difficulty in downstream separation. In contrast, the composite catalyst can be readily separated from aqueous solutions by filtration. The silicate layers in the samples not only act as media allowing $TiO_2$ to disperse in nano-crystals but also link the distributed $TiO_2$ nano-crystals to large granules which can be recovered easily.

Besides this, we also found that nickel catalysts supported on $ZrO_2$-composite and $Al_2O_3$-composite exhibit high conversion rate for methane reforming with carbon dioxide. The catalyst maintains the high activity for over 170 hours, much longer than the catalyst supported activated $Al_2O_3$.

These findings highlight the potential of the metal oxide composites as advanced materials. These solids can be readily granulated to designed shapes and the grains have good mechanical strength because of the presence of a silicate framework structure.

In comparison to the prior art, the method of the current invention has a prominent advantage that it can be conducted in aqueous system at moderate conditions. Moreover, this synthesis utilises the reaction between the clay suspension and the oligomer solution to form composite nanostructure with assistance of PEO surfactant, being profoundly different from the synthesis of the well-known pillared clay materials. Actually, such a synthesis route is not limited to laponite, we have prepared composites from natural layered clays such as saponite and hectorite. This new synthesis technique allows us to design and engineer composite nanostructures with desirable pore and surface properties.

The metal oxide nanoparticles in exfoliated laponite produced by the process of the invention are highly porous with large surface areas, generally greater than 500–900 m$^2$/g.

The process of the invention also allows the pore framework to be tailored to meet use requirements.

The high thermal stability and porosity of the metal oxide nanoparticles in exfoliated laponite in addition to their cost effective production methods, make them more favourable than the currently available pillared clay catalyst.

Throughout the specification the aim has been to describe the preferred embodiments of the invention without limiting the invention to any one embodiment or a specific collection of features.

In addition, throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

The invention claimed is:

1. A method of producing metal oxide nanoparticles in an exfoliated synthetic layered silicate framework comprising the steps of:
    forming an aqueous exfoliated synthetic layered silicate suspension having a high pH by mixing a layered clay into water until clear;
    forming an acidic hydrated metal species precursor solution by dissolving one or more transitional metal salts in water;
    adding a non-ionic surfactant and the hydrated metal species precursor solution to the aqueous exfoliated synthetic layered silicate suspension to form a product precursor;
    ageing at temperatures between 100° C. and 700° C. over a period of between one to three days to precipitate a product precursor;
    separating and washing the product precursor; and
    calcining the product precursor to form metal oxide nanoparticles in an exfoliated synthetic layered silicate framework.

2. The method of claim 1, wherein the non-ionic surfactant is a polyethylene oxide (PEO) surfactant selected from Tergitol 15S-5, Tergitol 15S-7, Tergitol 15S-9, or Tergitol 15S-12.

3. The method of claim 1, wherein the transition metal salts are selected from aluminium chloride; aluminium nitrate; aluminium hydroxychloride; ferric chloride; ferric nitrate; cerium chloride, lanthanum chloride, zirconium chloride; zirconium oxychloride; titanium (IV) isopropoxide, titanium chloride; or chromium chloride.

4. The method of claim 1, wherein the aqueous exfoliated synthetic layered silicate suspension is formed by adding approximately 1 g layered clay pe 50 mls water, and stirring until clear.

5. The method of claim 1, wherein 2 to 20 g of the non-ionic surfactant is added per 200 ml of aqueous exfoliated synthetic layered silicate suspension.

6. The method of claim 5 wherein the non-ionic surfactant is polyethylene oxide surfactant.

7. The method of claim 1, wherein the calcining step is carried out at temperatures between 500° C. and 1100° C., for periods of up to 20 hours.

8. The method of claim 1, wherein the method further comprises the steps of;
    adding the metal oxide nanoparticles in an exfoliated synthetic layered silicate framework into an aqueous solution of metal nitrates; and
    drying the solids to deposit metal onto the metal oxide nanoparticles in an exfoliated synthetic layered silicate framework.

9. Metal oxide nanoparticles in a synthetic layered silicate framework produced by the method of claim 8, wherein nickel metal is deposited onto a zirconium oxide nanoparticle in an exfoliated synthetic layered silicate framework.

10. Metal oxide nanoparticles in an exfoliated synthetic layered silicate framework when produced by the method of claim 1.

11. The metal oxide nanoparticles in an exfoliated synthetic layered silicate framework of claim 10 wherein the metal of the metal oxide is selected from one or more of titanium, zirconium, aluminum cerium, lathanun, iron, nickel and chromium.

12. The metal oxide nanoparticles of claim 10, having a BET surface area between 500 and 900 $m^2/g$.

13. The metal oxide nanoparticles of claim 10, wherein the pore size is between 3 and 9 nm.

14. Metal oxide nanoparticles in an exfoliated synthetic layered silicate framework when produced by the method of claim 1, having characteristics selected from two or more of the following;
   a) pore size between 3 and 9 nm;
   b) BET surface area between 500 and 900 $m^2/g$;
   c) thermal stability at temperatures equal to or greater than about 500° C.; or
   d) metal oxide nanoparticles particle size between 3 and 9 nm.

15. The metal oxide nanoparticles in the exfoliated synthetic layered silicate framework of claim 14, wherein the characteristics are selected from;
   a. BET surface area between 500 and 900 $m^2/g$; and
   b. metal oxide nanoparticles particle size between 3 and 9 nm.

16. The metal oxide nanoparticle in the exfoliated synthetic layered silicate framework of claim 14, wherein the characteristics are selected from;
   a. pore size between 3 and 9 nm;
   b. BET surface area between 500 and 900 $m^2/g$; and
   c. thermal stability at temperatures equal to or greater than about 500° C.

17. An adsorbent comprising metal oxide nanoparticles in an exfoliated synthetic layered silicate framework when produced by the method of claim 1, having a BET surface area between 500 and 900 $m^2/g$ and metal oxide nanoparticles particle size between 3 to 9 nm.

18. A photocatalyst comprising metal oxide nanoparticles in an exfoliated synthetic layered silicate framework when produced by the method of claim 1, having a pore size between 3 and 9 nm, BET surface area between 500 and 900 $m^2/g$, and thermal stability at temperatures equal to or greater than about 500° C.

* * * * *